Feb. 27, 1945.  N. M. MARSILIUS  2,370,367
MACHINE INDEX
Original Filed Aug. 28, 1941  4 Sheets-Sheet 1

Inventor
NEWMAN M. MARSILIUS
By John J. Hanrahan
Attorney

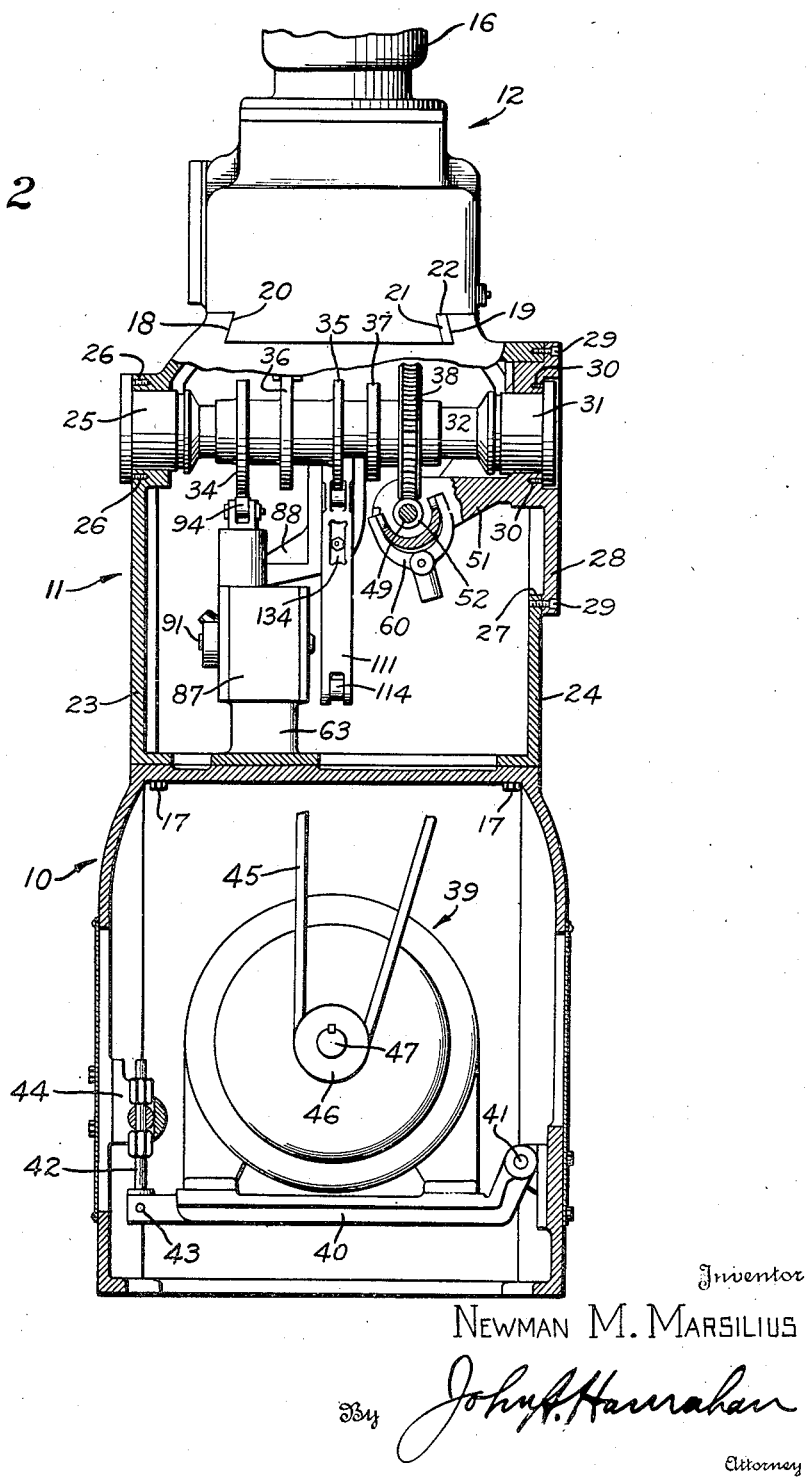

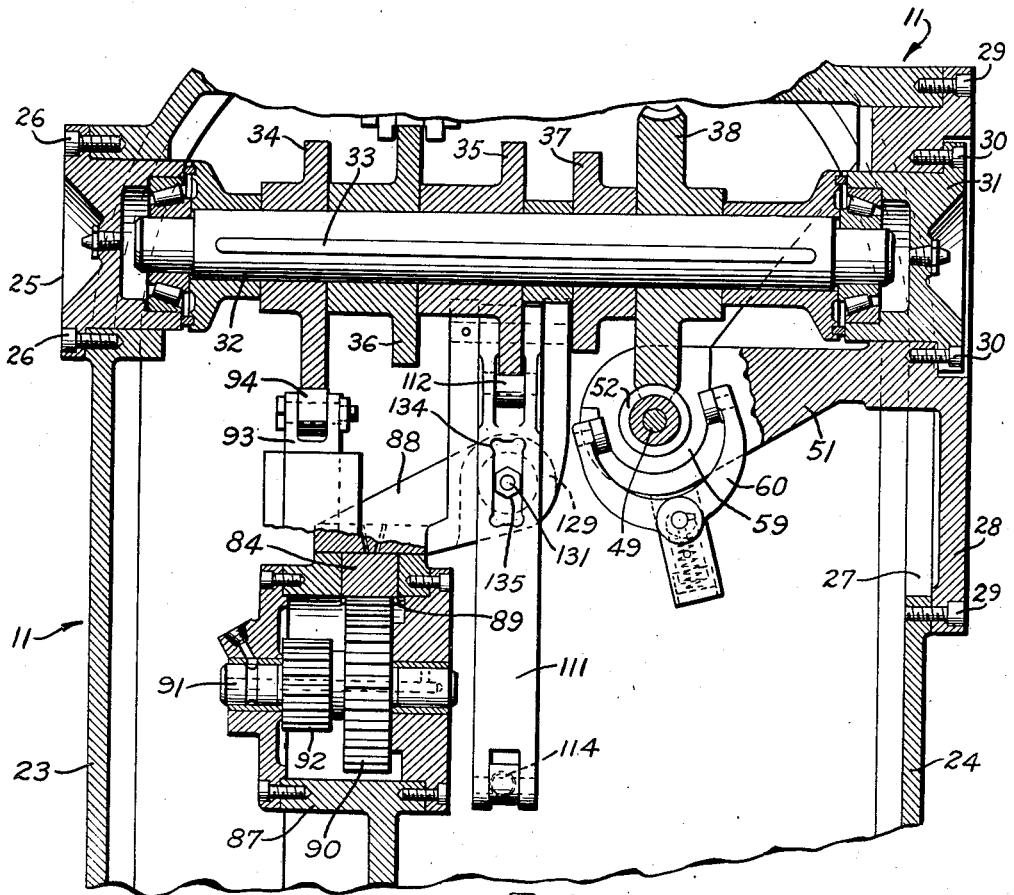

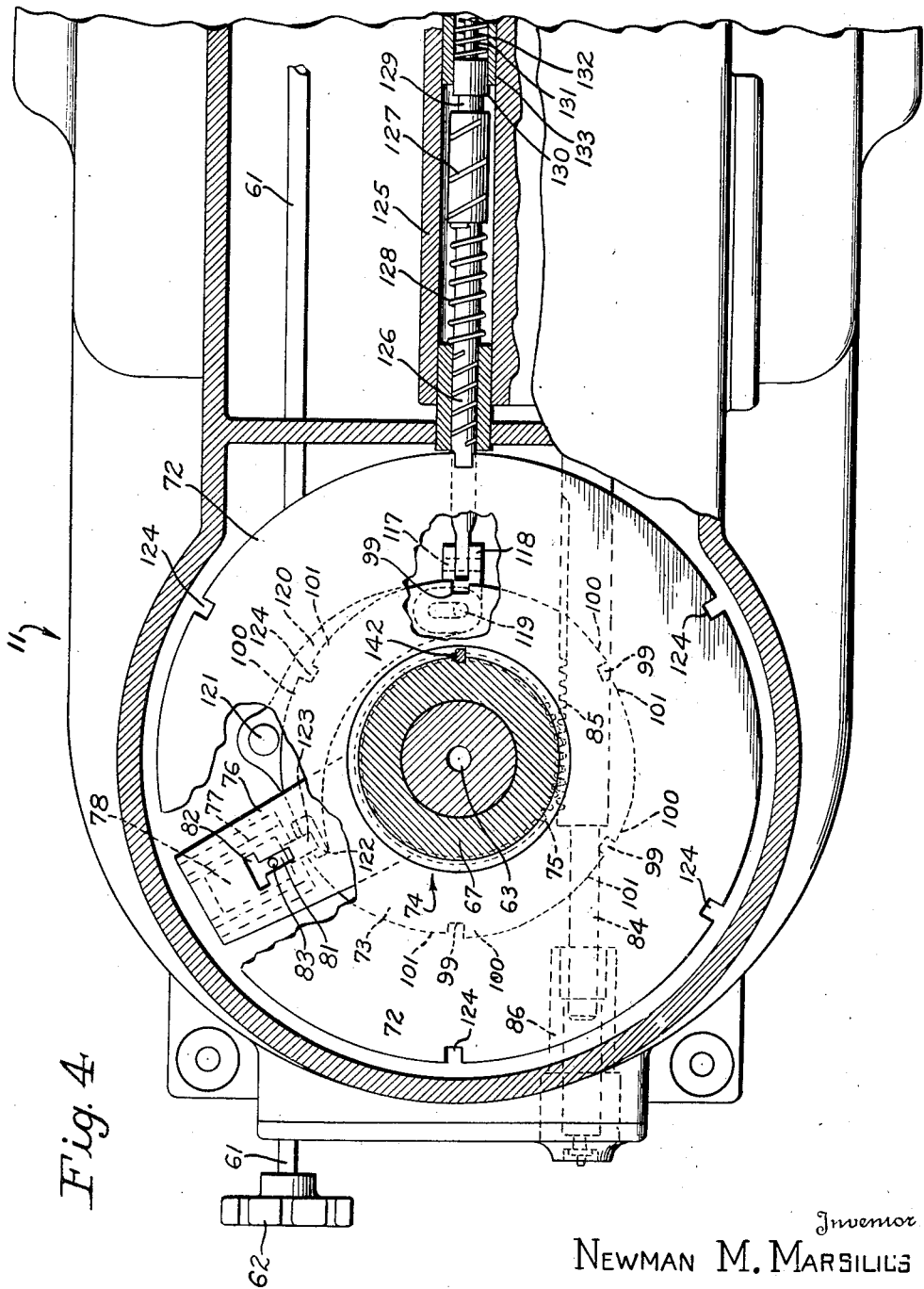

Patented Feb. 27, 1945

2,370,367

UNITED STATES PATENT OFFICE 2,370,367

MACHINE INDEX

Newman M. Marsilius, Trumbull, Conn.

Original application August 28, 1941, Serial No. 408,580, now Patent No. 2,353,480, dated July 11, 1944. Divided and this application December 16, 1943, Serial No. 514,496

5 Claims. (Cl. 90—56)

This invention relates to new and useful improvements in machines and has particular relation to an indexing means, herein shown as applied to a milling machine although not necessarily limited to use in such a machine.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 2 is a view partly in transverse section and partly in elevation showing the cam shaft and associated parts;

Fig. 3 is an enlarged sectional view taken as along the line 3—3 of Fig. 1;

Fig. 4 is an enlarged sectional view taken as along the line 4—4 of Fig. 1; and

Fig. 5 is an enlarged detailed sectional view through the indexing plunger and adjacent yoke structure.

Figure 1:
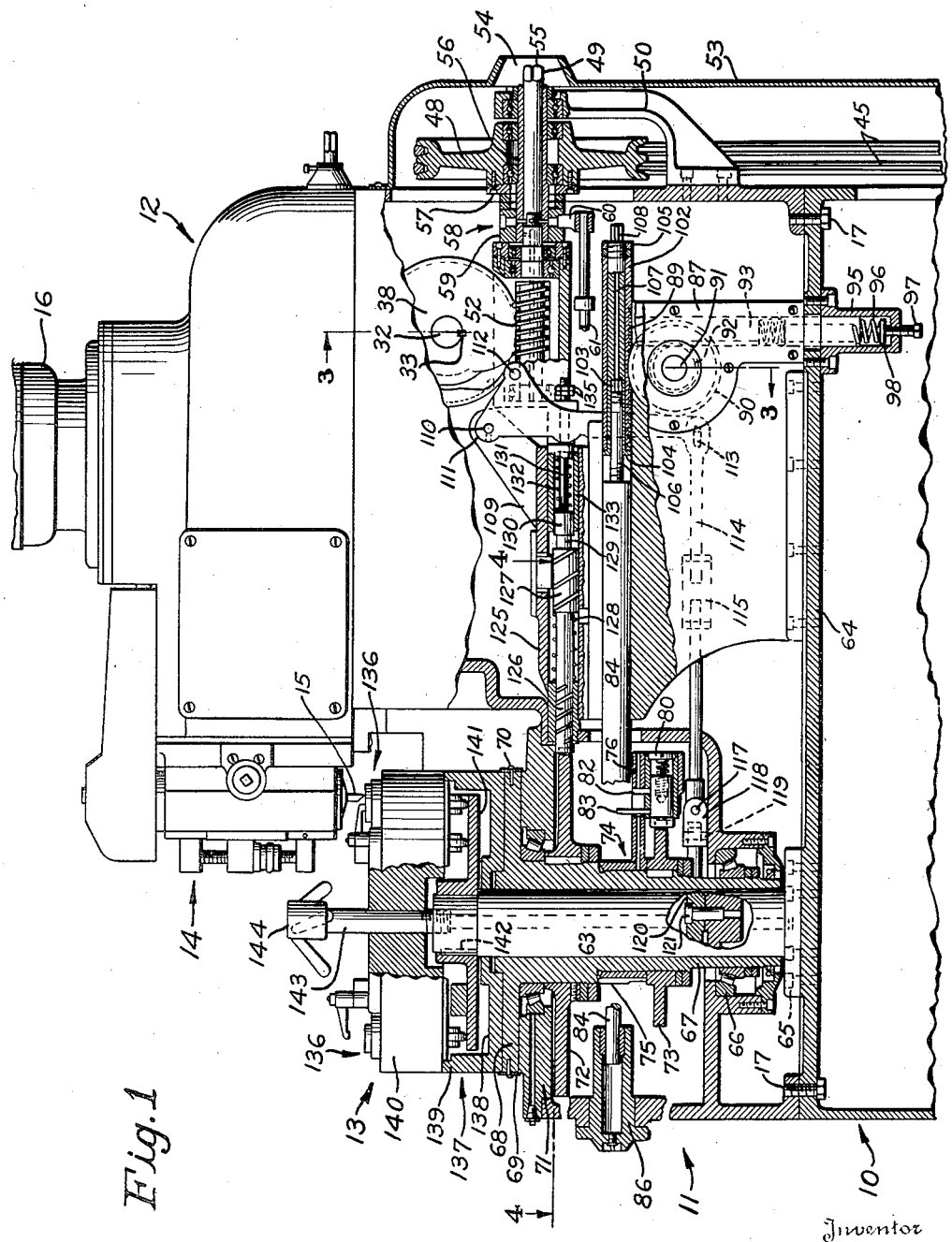
Fig. 1 is a view partly in side elevation and partly in longitudinal section showing a milling machine equipped with the indexing means of the invention.

The present application is a division of my application Serial Number 408,580 filed August 28, 1941, now Patent No. 2,353,480 issued July 11, 1944.

Referring in detail to the drawings the invention is shown as incorporated in a milling machine generally including a base 10, a bed 11 on said base, a horizontal tool head carrying slide 12 on said bed, and a work carrying turret 13 mounted on the bed at the forward side of the slide 12. Carried by the forward end of the slide 12 is a tool head generally designated 14 provided with a tool 15 driven from a motor 16. The details of the tool head construction and operation and the manner of driving the tool 15 from the motor 16 are all fully disclosed in my parent application above identified and will not be further disclosed herein.

Base 10, bed 11 and slide 12 are all hollow, preferably castings, and while the slide is longitudinally movable on the bed the latter is secured to the base as by bolts 17. At its upper side the bed 11 (see Fig. 2) is provided with undercut ways 18 and 19 in opposing relation and the lower end of the slide 12 is provided with rails 20 and 21 operating on said ways. Preferably a gib 22 is employed between rail 21 and way 19 for adjustment to take up for wear. It will be clear from the drawings that the rails 20 and 21 prevent any vertical movement of the slide on the bed and that the slide is movable longitudinally of the ways and is supported on their upper surfaces.

Bed 11 comprises side walls 23 and 24 of which the former removably supports a bearing 25 secured as by bolts 26 while the latter has an opening 27 over which is bolted a combined plate and bearing bracket 28 secured as by bolts 29. Mounted in the bracket 28 and secured by bolts 30 is a bearing 31 in alignment with the bearing 25. A main cam shaft 32 is rotatably mounted by the bearings 25 and 31. Bracket 28 may be removed along with the bearing 31 for replacement of any part mounted on the shaft 32 or in fact for replacement of said shaft should that be desirable.

A key 33 secures to the shaft 32, for turning movement therewith, an indexing cam 34, a turret locking cam 35, a cam 36 for imparting vertical movement to the tool head 14, a cam 37 for imparting horizontal movement to the slide 12 and a worm wheel 38 through which the shaft is driven. In the machine base 10 is an electric motor 39 mounted on a platform 40 pivoted at 41 and adjustable through a bolt 42 pivoted to the platform at 43 and anchored at its upper end to a bracket 44. Cams 36 and 37 and their associated mechanisms form no particular part of the present application and since they and their purpose and operation are fully disclosed in the parent application they will not be further considered herein.

Belts 45 trained over pulleys 46 on the shaft 47 of the motor 39 are also trained over a pulley 48 turnable about a shaft 49 extending horizontally into the bed 11 from the rear end thereof. Shaft 49 is mounted in an outside bracket 50 and inside bracket 51 (see Figs. 2 and 3). Within the bed this shaft serves, as will appear, to drive a worm gear 52 meshing with the worm wheel 38 above mentioned. A sheet metal or other guard or casing 53 encloses the above mentioned pulleys and belts and has an opening 54 giving access to the faced end portion 55 of the shaft 49 whereby the latter may be engaged by a wrench or other tool for manual turning while adjusting and tooling the machine for any particular job.

Actually pulley 48 is turnable on a sleeve 56 about the shaft 49 and one element, 57, of a clutch 58 is secured to the pulley. The other or movable element 59 of the clutch is keyed to the sleeve 56 and the latter is fast to the shaft 49. A yoke 60 is connected to the clutch element 59 in the usual manner and is operable by a rod 61 for shifting the element 59 into and out of clutching engagement with the element 57. The rod 61 extends to the forward end of the machine and is there equipped with an operating knob 62 in convenient reach of the operator. It will be clear that on manipulation of the rod 61 motor 39 may be placed in driving relation to the cam shaft 32 and may be disconnected therefrom at will.

The turret 13 is mounted for turning movement about the upper end of a stationary post 63 projecting upwardly through the forward portion of the bed 11 and mounted and secured on the top wall 64 of the base 10 as by means of bolts 65. Disposed about the post 63 for turning movement relative thereto and having suitable bearings 66 is a sleeve 67. Adjacent its upper end sleeve 67 has secured thereto or integral therewith a disc-like member 68 carrying a dust guard 69 in the form of a sheet metal ring fastened to the disc-like part as by screws 70. Keyed or otherwise fastened to the sleeve 67 below a wall portion 71 of the bed 11 is a turret locking wheel 72 and also secured to the sleeve and located below wheel 72 is a turret indexing wheel 73.

Between such wheels and turnable about the sleeve 67 is a member 74 comprising a gear or gear segment 75 and an indexing yoke 76. The position of rest of this member 74 and yoke 76 is properly shown in Fig. 4 while in Fig. 1 the yoke is shown 120 degrees out of place. Supported by the yoke 76 at its under side is a cylinder 77 slidably mounting a pawl or plunger 78 normally urged to a projecting position (see Figs. 1 and 5) by a coil spring 79 bearing also against a plug 80 in the rear end of the cylinder.

In the yoke and in a wall of the cylinder 77 are aligned T-shaped slots having stem portions 81 and lateral portions 82. Secured in the indexing plunger 78 and projecting through such slots is a pin 83. This pin serves to maintain the plunger in proper alignment when the pin is in the stem portions 81 of the T-shaped slots. When the turret is not to be indexed the pin 83 is grasped and drawn back in the slots and moved into a lateral portion whereby the plunger 78 will be held in a retracted position against the urging of the coil spring 79.

A horizontal bar 84 (Figs. 1 and 4) carries rack teeth 85 meshing with the rack teeth 75 and this bar at its forward end is slidably supported in a member 86 and at its rearward end in a housing 87. This housing is supported in any suitable manner as by a bracket 88 (see Figs. 2 and 3). Within the housing 87 the bar 84 is provided with rack teeth 89 meshing with the teeth of a gear 90 mounted on a shaft 91 with a smaller diameter gear 92. The relative diameters of the gears 90 and 92 may be as desired but as shown the gear 90 is twice the diameter of the gear 92 and the purpose of this arrangement is to increase the throw obtained for a given cam rise.

A vertically disposed rack 93 carries at its upper end a roller 94 engaging the indexing cam 34 hereinbefore mentioned. Rack 93 passes into the housing 87 and has its teeth meshing with those of the small diameter gear 92. Clearly as the high point of cam 34 rides against the roller 94 the rack 93 will be forced downwardly and will cause a rotary movement of the gear 92 and gear 90 and the movement of the latter will result in a horizontal forward movement of the bar 84. The lower end portion of rack 93 enters a depending extension 95 of the housing 87 and therein engages a coil spring 96 which may be adjustably compresesd by the tightening of a screw 97 accessible from the exterior of the housing but within the latter carrying a disc 98 on which the lower end of the spring 96 engages. It will be understood that as the rack 93 is forced downwardly the spring 96 will be compressed and that when the high point of the indexing cam 34 recedes the compressed spring will return the rack 93 maintaining the roller 94 in contact with the cam.

As herein disclosed the turret is provided with six stations although it will be understood that the number may be varied. Indexing wheel 73 is provided with a number of notches 99 corresponding with the number of stations on the turret. The index wheel is moved counter-clockwise. It is relieved a slight amount at the trailing side of each notch 99 whereby the leading edge 100 of each notch projects radially beyond the trailing edge 101 thereof for a purpose to be described. The indexing of the turret takes place through movement of the sleeve 67 and its disc 68 by which the turret is carried.

Thus in predetermined timed relation as the index cam 34 forces the rack 93 downwardly the small diameter gear 92 is turned and through the shaft 91 turns the larger diameter gear 90 meshing with the teeth 89 of the bar 84 whereby the latter is moved rearwardly. Teeth 85 on the forward portion of the bar meshing with the teeth 75 of the member 74 impart rotary movement to such member about the sleeve 67. However, member 74 includes the indexing yoke 76 carrying the indexing plunger 78 and as the latter is, when in a position of rest, engaged in one of the notches 99, the index wheel is turned in a counter-clockwise direction an amount depending on the arc through which the member 74 is moved by the rearward movement of the bar 84. Since the indexing wheel is keyed to the sleeve 67 the latter is given an indexing movement with the wheel.

Means are provided for releasing the plunger 78 from the engaged notch 99 of the index wheel at the end of each indexing movement and for simultaneously locking the sleeve and thus the turret against casual movement. At the end of the indexing movement as the high point of the cam 34 recedes the spring 96 urges the rack bar 93 upwardly maintaining the roller 94 in engagement with the cam 34 and causing reverse movement of the gears 92 and 90, the bar 84 and the indexing member 74 returning all these parts to their normal positions. During this return movement the front support 86 of the bar 84 acts as a dash pot whereby the described return movement is a steady motion.

The rack teeth 89 are on a hollow bar-like member 102 carried by a sleeve 103 and the member is held on the sleeve between a flange 104 at one end and nuts 105 at the other end. Sleeve 103 is threaded onto a reduced diameter rear end portion 106 of bar 84 for attaching the rack teeth carrying member 102 to said bar and for threading more or less onto the end 106 to adjust the effective relation of the rack to the gear 90 and thus to adjust the throw of bar 84 and the arc of the indexing movement imparted to the wheel 73. A pin 107 through the sleeve 103 is held against the end of reduced portion 106 of bar 84 and is tightened by screw 108 to establish a lock and prevent casual turning of the sleeve 103 on portion 106. When any adjustment of the sleeve and thus of the rack teeth 89 is to be made the screw 108 is first backed off the pin 107.

Cam 35 above referred to as a locking cam serves to lock the sleeve 67, and thus the turret 13, in exact position at the end of each indexing movement and to maintain these parts in fixed positions until time for the next indexing movement. Simultaneously as said cam actuates means to effect locking of the turret it actuates other means to retract the plunger 78 from a notch 99 of the wheel 73 whereby on the above described return movement of bar 84 the member 74 together with the indexing yoke 76 and the parts carried thereby are returned to their normal positions. To the above ends a bracket 109 (Fig. 1) has pivoted thereto at 110 an arm 111 carrying a roller 112 riding against the cam 35. At its lower end by a pin and slot connection 113 arm 111 is connected with the rear end of a bar or link 114 comprising a pair of parts adjustably connected by a turn buckle 115.

At its forward end bar 114 has secured thereto a link element 116 pivoted at 117 to an element 118 having a pin and slot connection 119 with an end of a dog 120 pivoted intermediate its ends at 121 and at its free end having an upstanding lug 122. In the normal position or the position of rest of the dog 120 the lug 122 is immediately forwardly of the reduced tooth-like end portion 123 of the pawl 78 when the latter is at the end of an indexing stroke. The relation of the cams is such that at the end of an indexing stroke the yoke 76 is positioned as in Fig. 4 and then the cam 35 through links 114 causes rocking movement of the dog 120 about the pivot 121 in a direction to have lug 122 force the plunger 78 to a retracted position against the tendency of the spring 79. At this time, as will later appear more in detail, the sleeve 67 and the parts carried thereby are locked against turning movement.

Therefore, with the plunger 78 retracted, as return movement is imparted to the bar 84 the member 74 and the parts carried thereby, including plunger 78, are returned to their normal positions. Lug 122 is of a width greater than that of a notch 99 of the indexing wheel and consequently when it has forced the plunger to a retracted position it prevents it from again immediately entering the same notch and on leaving the lug 122 the plunger rides against the edge of the wheel 73 until it comes to the next notch into which it is snapped by the spring 79.

Locking wheel 72 has a series of notches 124 opening through its outer edge and the notches 124 correspond in number and in relative spacing with the notches 99 in the indexing wheel 73. A casing 125 mounts a plunger means including a slidable bolt 126 adapted to be forced into one of the notches 124 simultaneous with the retraction of the plunger 78 from one of the notches 99. Bolt 126 includes an enlarged diameter portion 127 against which bears an end of a coil spring 128 and this spring normally serves to retain the bolt in retracted position free of the wheel 72. Against a reduced diameter portion 129 of bolt 126 head 130 of a plunger 131 bears and a coil spring 132 surrounds the stem portion of said plunger. Plunger 131 and spring 132 are enclosed in a suitable casing 133 through which the arm 111 depends. The shank of plunger 131 passes through an opening 134 (Figs. 2 and 3) in arm 111 and beyond the casing 133 has a nut 135 threaded thereon.

Tightening of the nut 135 retracts plunger 131 increasing the compression of spring 132. As arm 111 passes through the rear of casing 133 when said arm is rocked about pivot 110 by the cam 35 the casing is forced forwardly or in the direction of the front of the machine. At this particular time the machine has been indexed and one of the notches 124 of wheel 72 is in alignment with the forward end of bolt 126. Therefore since plunger head 130 is against the rear end of the bolt and is moved forwardly with casing 133 the bolt is projected against the action of spring 128 and enters a notch 124 locking the wheel 72 and sleeve 67 together with all parts carried thereby against any casual turning movement. To insure locking of the wheel 72 by bolt 126 the casing 133 is given excessive forward movement further compressing the spring 132 through which the arm moves the casing.

When the bolt seats in a notch 124 the casing 133 continues its forward movement but such movement results only in the sliding of the casing and further compression of the spring 132 since plunger 131 at this time is solid against bolt 126 and the latter has solidly seated in a notch 124. The cam 35 retains the locking parts in the above described positions while the member 74 has its return movement and while a piece of work is being acted on by the tool 15. When the next indexing movement is to be made cam 35 recedes from roller 112 and the spring 128 returns the bolt 126, plunger 131, casing 133, arm 111 and link 114 and its connected parts to their normal positions. As bolt 126 is withdrawn from a notch 124 movement is imparted to bar 84 and an indexing stroke made at the end of which plunger 78 is withdrawn from a notch 99 of the indexing wheel and simultaneously the forward end of the bolt 126 is "socked" into the next notch of the locking wheel 72.

Turret 13 is provided with work holders generally designated 136 the construction and operation of which is given in detail is the parent application. Generally the number of work holders on the turret corresponds with the number of the notches in the indexing and locking wheels, respectively. The turret comprises a base portion 137 including a disc-like part 138 disposed on the disc or flange 68 of the sleeve 67 whereby the turret turns with the sleeve.

In addition base portion 137 includes an upstanding circular wall 139 supporting the turret block 140. Mounted in base portion 137 is a cam carrying plate 141 fixed at 142 to the post 63 whereby to be held stationary with the latter. Cams, the construction and operation of which are fully set forth in my parent application are mounted on the plate 141 but since such cams form no particular part of the subject matter of the present application they are not considered further herein. Compressed air is fed through the post 63 to a pipe 143 mounting a manifold 144 for distributing such compressed air as and for the purpose set forth in my said parent case.

At any point in the operation of the machine the latter may be stopped by disconnecting the elements of clutch 58, i. e., by pushing the knob 62 of the rod 61. The indexing operation may be briefly described as follows: Cam 34 depresses the rack bar 93 rotating gears 92 and 90 in a manner to shift the bar 84 rearwardly. This bar through its engagement with the teeth 75 of the element 74 imparts a turning movement to the latter and the yoke 76 with which pawl or plunger 78 is movable. The plunger being engaged with a notch 99 of the wheel 73 the latter is turned and being fast to sleeve 67 turret 13 is indexed one station. At the end of the indexing movement lock bolt 126 is forced into a notch of the locking disc 72 and the dog 120 is operated through link 114 forcing plunger or pawl 78 out of the notch of the indexing wheel and permitting member 74 carrying the pawl to move back to normal position as the spring 96 moves the rack bar 93 upwardly as the high point of cam 34 recedes from roller 94. The cams 34 and 35 have their profiles in such relation to one another that the turret is indexed and locked in its new position and then the indexing pawl is forced out of a notch 99 of the indexing wheel.

Having thus set forth the nature of my invention, what I claim is:

1. In a machine, a stationary post, a sleeve turnable about said post, a turret supported by and turnable with said sleeve, a notched indexing disc fixed to said sleeve to turn therewith, an indexing yoke turnable about said sleeve, gear teeth on said yoke, an indexing pawl on said yoke and normally engaged in a notch in said disc, a bar carrying rack teeth meshing with the teeth on said yoke whereby as the bar is moved in one direction an indexing movement is imparted to said disc and thereby to the sleeve and turret, other rack teeth on said bar and spaced from the first teeth, a gear meshing with said other rack teeth, a cam, means rotating said cam, a rack moved in one direction by said cam, a gear meshing with the teeth of the last mentioned rack, said second mentioned gear of less diameter than the first mentioned gear and positively connected therewith to drive the same whereby for a given rise on said cam a greater linear movement is imparted to the first two mentioned sets of rack teeth, means for locking said turret against movement between indexing movements thereof, and means to release said indexing pawl from a notch of said indexing disc on locking of said turret.

2. In a machine, a turret, a rotatable cam, means to continuously rotate said cam, a rack bearing at one end against said cam and moved in one direction thereby, a gear driven by said rack, a second gear, a rack the teeth of which mesh with those of the second gear, said second gear of larger diameter than the first gear and positively driven thereby whereby a given rise in the cam will effect a proportionately greater linear movement of the second rack, means for translating such linear movement of the second rack into indexing movement of the turret, said last means including an indexing disc fixed to said turret, an indexing pawl for imparting movement to said disc and thereby to the turret, means whereby the second rack imparts indexing and return movements to said pawl, and means for locking said turret against movements during return movements of said pawl.

3. The combination as in claim 2 including a spring for imparting return movement to the first mentioned rack and thus through said gearing to the second mentioned rack and said indexing pawl.

4. In a machine, a turret, a notched indexing disc and a notched locking disc movable with said turret, a pair of cams, means to move said cams, means operated by one of said cams for applying indexing movements to the indexing disc and the turret and locking disc, a locking bolt operated by the other cam to enter a notch of the locking disc and maintain the latter and the indexing disc and turret against movement between such indexing movements, said locking bolt comprising a two part structure of which the forward part is moved by the other part to locking position through a coil spring, and said other cam adapted to give excessive movement to the other part of said bolt to insure full movement of the forward part thereof to locking position.

5. In a machine, a vertical support, means mounting said support for turning movement about a vertical axis, a notched indexing disc and a vertically spaced notched locking disc both fixed to said support, a horizontal cam shaft, first and second cams on said shaft, means to rotate said shaft and thereby said cams, indexing means operated by the first cam for applying indexing movements to said indexing disc and thus to said support and locking disc, locking means operated by the second cam into a notch of the locking disc whereby to maintain the latter, support and indexing disc against movements between indexing movements, said indexing means including a spring pressed reciprocable pawl normally engaged in a notch of the indexing disc, and a pivoted dog operated by the second cam for moving said pawl out of a notch of the indexing disc as said locking means is moved into a notch of the locking disc.

NEWMAN M. MARSILIUS.